Dec. 29, 1964 W. N. JENKINS ETAL 3,163,566
CONTINUOUS HEAT TREATMENT OF ELONGATE METAL MATERIAL
Filed April 20, 1961 2 Sheets-Sheet 1

INVENTORS
W. N. Jenkins
A. G. Shakespeare
BY

ATTORNEYS

Dec. 29, 1964    W. N. JENKINS ET AL    3,163,566
CONTINUOUS HEAT TREATMENT OF ELONGATE METAL MATERIAL
Filed April 20, 1961    2 Sheets-Sheet 2

INVENTORS
W. N. Jenkins
A. G. Shakespeare
BY
ATTORNEY

United States Patent Office 3,163,566
Patented Dec. 29, 1964

3,163,566
CONTINUOUS HEAT TREATMENT OF ELONGATE METAL MATERIAL
Walter Norman Jenkins and Alan Gough Shakespeare, Swansea, Glamorgan, Wales, assignors to The British Iron and Steel Research Association, London, England
Filed Apr. 20, 1961, Ser. No. 104,342
Claims priority, application Great Britain, Apr. 28, 1960, 14,914/60; July 6, 1960, 23,630/60; Feb. 1, 1961, 3,786/61
12 Claims. (Cl. 148—150)

This invention relates to the continuous heat treatment of moving elongate metal material and is more particularly, but not exclusively, concerned with the continuous annealing of steel strip or wire.

The present invention provides in one aspect a continuous heat treatment process for moving elongate metal material, which comprises including at least part of said material passing between first and second portions of the path of the material in an electrically conductive circuit; heating that part of the material included in said circuit by use of a transformer arrangement, the secondary circuit of which is formed by said electrically conductive circuit, and the core of which is disposed around a part of said circuit other than the part formed by the material to be heated; and passing said material through a liquid heat transfer medium arranged to circulate between said first and second path portions.

In a preferred form of this aspect of the invention the liquid heat transfer medium is electrically conductive and together with the material passing therebetween forms said secondary circuit, the core of said transformer arrangement being disposed around part of the circulatory path for said medium.

In another aspect the invention provides apparatus for the continuous heat treatment of moving elongate material in accordance with the above process, comprising a container for said liquid heat transfer medium having two chambers for the passage of said material therethrough, and adapted for the circulation of said medium between said chambers; and transformer means the core of which is disposed around part of said container.

In order that the present invention may be more clearly understood, the same will now be described, by way of example, with reference to FIGURES 1 to 4 of the accompanying drawings, which illustrate different embodiments of apparatus in accordance with the invention.

Figure 1:
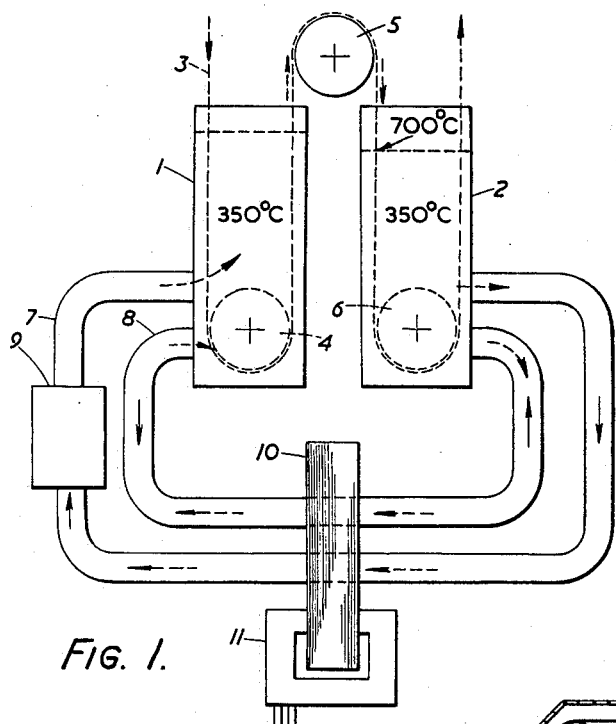

The apparatus of FIGURE 1 comprises two heat treatment baths 1 and 2 placed side by side a short distance apart and metal strip 3 is passed through the baths over guide rolls 4, 5 and 6. The guide roll 4 is positioned at the bottom of bath 1, guide roll 6 at the bottom of bath 2, and guide roll 5 between and adjacent the upper ends of the two baths, the axes of the three guide rolls being parallel to one another. Thus strip fed through the apparatus passes through bath 1 around guide roll 4, between the two baths over guide roll 5, and through bath 2 around guide roll 6.

The two baths contain liquid metal and are connected by means of two pipes 7 and 8, the pipe 7 including a mechanical or electromagnetic pump 9 for circulating the liquid metal between the two baths.

The two pipes 7 and 8 extend parallel to one another and are embraced by an induction heater core 10 having a primary winding 11 connected across a mains supply. The secondary winding for the induction heater is formed by the liquid metal and the length of metal strip extending between the two baths over the guide roll 5 which is supported on an insulated mounting. Since the major part of the electrical resistance of this secondary circuit is constituted by the length of metal strip, this length of strip will be heated and the circulating liquid metal only slightly so in comparison. The secondary winding for the induction heater is indicated by broken line arrows.

In the operation of this apparatus for continuous annealing, for example, metal strip is preheated when passing through bath 1, is heated to a high temperature between baths 1 and 2 by induction heating, and is quenched when passing through bath 2. This continuous heat treatment cycle may be explained as follows: the heated strip transfers heat to the cooler liquid metal in bath 2 and is itself quenched by such action, and the liquid metal heated in bath 2 is circulated through pipe 7 to bath 1 where it transfers heat to the cooler incoming strip to preheat the strip. The liquid metal passing through bath 1 is thus cooled and circulates through pipe 8 to bath 2 to quench outgoing strip. The circulation of liquid metal is indicated by full line arrows.

It will be appreciated that to obtain the high strip temperatures required for continuous annealing, for example the length of strip between baths 1 and 2, which is in motion, must be strongly heated. It is therefore desirable that the length of strip to be heated be small. Also it is found necessary in practice to make use of a core 10 of large physical size to obtain appropriate heating currents in the strip.

These two requirements which would otherwise be contradictory can both be satisfied by use of the present invention. Thus in the above arrangement of FIGURE 1 the length of strip extending between baths 1 and 2 is determined by the spacing apart of the baths and the diameter of the insulated guide roll 5, and by making these small the length of this strip portion may be made short. At the same time the core 10 is disposed around pipes 7 and 8 which may be suitably disposed and of such length as to accommodate a suitable size and form of core.

The result of such an arrangement in accordance with the invention in FIGURE 1 is that very high rates of heating can be produced from the preheating bath temperature of 350° C., for example, to an annealing temperature of the order of 700° C., with consequently lower heat losses. Also the strip passing between the two baths is readily accessible and radiation pyrometers can be readily employed.

In practice the strip extending between the two baths will be maintained in a protective atmosphere. Also to commence operation the metal in the baths and pipes can be melted down by use of a shorting bar between the two baths, and the heating transformer. It is of course preferable to insert such a shorting bar with its ends in the liquid metal after one operation and before this metal freezes, if in fact freezing is allowed to occur before the next operation.

In the design of the apparatus of FIGURE 1 the cross-sectional area of the pipes can be so chosen that sufficient electrical power is dissipated in the liquid metal to compensate for heat losses from the plant.

Figure 2:
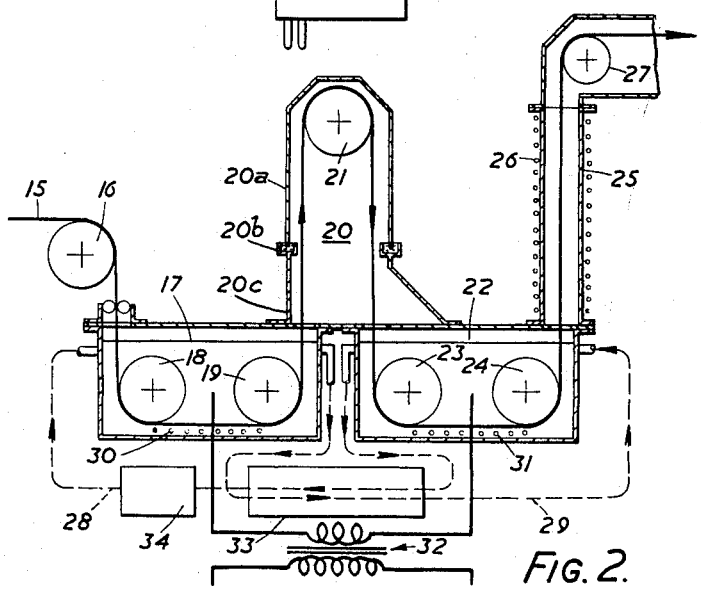

FIGURE 2 illustrates another embodiment of apparatus according to the invention in which a strip 15 is fed over a guide roll 16 and passes downwardly into a preheat bath 17 where it passes around guide rolls 18 and 19 to emerge upwardly into a casing 20 containing a protective atmosphere. The lower edge of the upper part 20a of the casing is supported in a trough 20b formed around the upper edge of a lower part 20c of the casing, this trough containing molten lead alloy, for example.

After passing over a guide roll 21 in the upper part of the casing, the strip is fed downwardly into a quench bath 22, passes around guide rolls 23 and 24, and emerges from quench bath 22 upwardly through a conduit 25 surrounded by a heating coil 26. From this conduit, the strip passes over a guide roll 27 to an auxiliary quench bath (not shown).

The baths 17 and 22, which contain liquid metal to a substantial depth, are interconnected by two pipes 28 and 29. Within these baths, below the strip path, are electrical heating elements 30 and 31, respectively, each connected through a copper bus bar with one side of the secondary winding of a heating transformer 32, the secondary circuit being completed by the strip extending between the two baths 17 and 22. In order to prevent a short circuiting current flowing in the pipes 28 and 29, a choke 33 surrounds a portion of each pipe where the two pipes extend alongside one another. A pump 34 is connected in pipe 28 for circulating the liquid metal between the two baths as in the embodiment of FIGURE 1.

In the embodiment of FIGURE 2 it will be seen that again the length of strip extending between the two baths can be made short in order to obtain a high rate of heating. Also in this case the transformer core is located apart from the liquid metal container consisting of the baths and pipes and so may be of any desired size or form.

Figure 3:
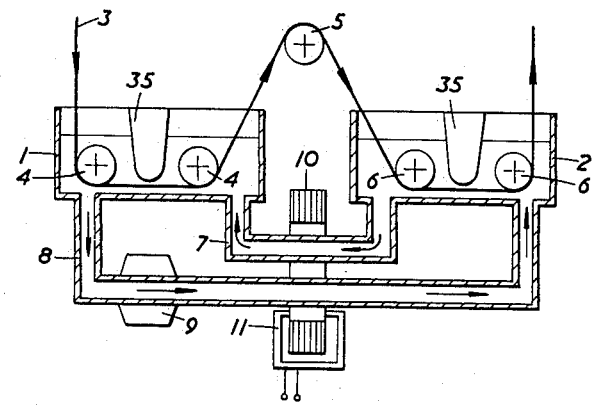
Figure 4:
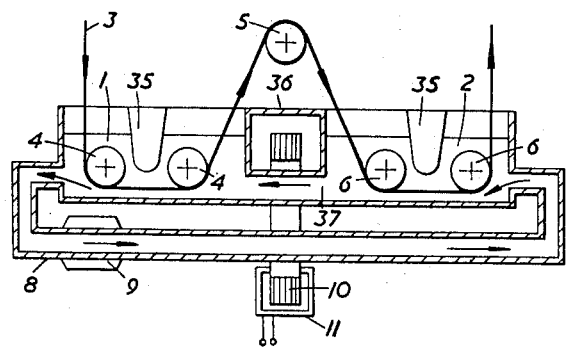

FIGURES 3 and 4 illustrate further embodiments of apparatus similar to FIGURE 1 in that a heating transformer core is disposed around circulating pipes for the liquid heat transfer medium. Accordingly, the same reference numerals are employed for corresponding components of these figures where appropriate.

In FIGURE 3 strip 3 is passed through liquid metal in two baths 1 and 2 by means of pairs of guide rolls 4, 4 and 6, 6 in these baths and an inter-bath guide roll 5. As before the strip 3 passing between the two baths will be maintained in a protective atmosphere. The liquid metal is circulated between and through the baths by use of two connecting pipes 7 and 8, and an electromagnetic pump 9.

The directions of strip travel and liquid circulation are indicated by arrows and it will be noted that this arrangement is such that the strip and liquid move in opposite directions in the baths 1 and 2. The heat treatment cycle is basically similar to that with use of the apparatus of FIGURE 1 or 2, with pre-heating of strip occurring in bath 1 and quenching of strip in bath 2. However, by use of the counterflow arrangement in the baths 1 and 2 of FIGURE 3 as between strip flow and liquid metal flow, it will be seen that the efficiency of the heat treatment cycle is increased.

In a practical application of such a process for continuous annealing, say, the liquid temperatures in pipes 7 and 8 may be of the order of 200° C. and 600° C., for example, and should exhibit substantially linear temperature gradients in the baths 1 and 2 between the connections of pipes 7 and 8 thereto.

Thus, in this case it is important that the liquid temperature in the baths 1 and 2 should not become uniform. For this reason baffle members 35 are disposed between the pairs of rolls 4, 4 and 6, 6 as shown.

Also, since the pipe 7 is what may be regarded as the high temperature pipe, it is preferably manufactured from appropriate material, such as high chromium steel, to avoid any reaction which may occur with the liquid metal. The baths 1 and 2 are also preferably manufactured from such material, but the low temperature circulation pipe 8 may be manufactured from mild steel.

As in the case of FIGURE 1 the heating transformer core 10 is disposed around both pipes 7 and 8, and affords the advantage that the core may be of large size, and in such disposition does not affect the strip loop length around guide roller 5.

As a result of the above preference for pipe 7 to be made of a material which is in fact expensive, it may accordingly be desirable to maintain this pipe as short as possible, thus at the same time reducing heat losses. FIGURE 4 illustrates one form of apparatus wherein this is carried out by use of a single tank separated into two baths 1 and 2 by use of a hollow partition member 36. This member 36 extends across the tank, but not to the bottom, where it leaves a duct 37 which replaces the high temperature circulation pipe 7.

The transformer core is disposed around the pipe 8 and duct 37, passing through the partition member 36, to give rise to a two turn secondary winding as before. Should there be any limitation on the size of core 10 by passage through partition member 36 in this case, this may be compensated by giving the pipe 8 convolutions to increase the effective number of turns in the secondary circuit.

The latter feature may equally well, be adopted in the embodiments of FIGURES 1 and 3, if desired.

The proportions of the heating transformer core may also be reduced, for a given heating effect, by use of higher frequency power supply to the primary circuit 11 than normally available from conventional sources, the amount of iron being inversely proportional to the frequency of primary supply. A suitable frequency may be 500 cycles/second, for example.

Although in the above arrangements of FIGURES 1, 3 and 4 there is no mention of enclosing the upper portions of baths 1 and 2 this will normally be effected in similar manner to the arrangement of FIGURE 2. However, any suitable means may be employed for strip entry and exit to and from the baths, and low pressure gas-sealed openings in the upper bath covers is one example of a suitable arrangement.

Suitable heat transfer mediums for use with the present invention are lead, lead/bismuth, lead/antimony, or some liquid salts such as barium salts, for example. Of these examples, lead is economic but has the disadvantages of a relatively high melting point, namely, above 300° C., compared to desirable pre-heating and quenching temperatures of the order of 200° C. for continuous annealing of steel strip. Lead/bismuth, although comparatively expensive is at present preferred since a melting point as low as 124° C. may be obtained with lead/bismuth eutectic. Also lead/bismuth does not exhibit change of volume on solidifying, so that when not in use it may be allowed to "freeze" in the apparatus and be subsequently remelted by use of the transformer heating and a suitable shorting conductor in place of the strip, which conductor may be bridged across the liquid in baths 1 and 2 before freezing.

In practical application of the present invention it will normally be found necessary, when employing high temperatures, to take account of so-called liquid "drag-out" and for this purpose the invention described in the specification of our application No. 3,787/61 is preferred.

Also if it is desirable to control or measure operating temperatures, the invention described in the specification of our application No. 3,788/61 is preferred.

Although particular reference has been made to continuous annealing of steel strip in the above description, the present invention is not intended to be taken as limited in this way, and in fact has considerable application for different heat treatment processes.

To enumerate some of these applications: the invention is applicable to the continuous annealing of tinplate, including very thin tinplate, drum stock, stainless steel, mild steel, and thin and narrow strip. Also, it is applicable to mar-tempering of medium carbon strip; and the flow brightening and annealing of aluminised strip, promoting adhesion between the aluminium and strip.

Heat treatment of wire is also possible by use of the present invention; and continuous stretching thereof to reduce the cross-section, as an alternative to rolling for the same purpose, is practicable with use of the temperature control aspect of the invention described in our application No. 3,788/61. The general difficulty in such an operation of the wire yielding as a result of the heat generated on stretching is obviated in the latter application of the invention with temperature control.

Furthermore, the invention may be applied to the vapour deposition of materials on strip, and for chromising, for example, by temporarily passing the strip through a vacuum chamber at an intermediate stage of the heat treatment, wherein the deposition material is supplied. Such application is similar to the oxide later formation described in our application No. 3,787/61.

We claim:

1. A continuous heat treatment process for moving elongate metal material which comprises passing the material in succession through first and second liquid heat transfer medium stations; circulating electrically conductive liquid metal heat transfer medium around a closed path including said first and second stations, the direction of circulation of the liquid medium through at least said second station being opposite to that of said material therethrough; heating that part of said material passing between said first and second stations by transformer action to induce a secondary current circulating around a closed electrical circuit including the material to be heated and the liquid medium at said first and second stations; and maintaining said liquid medium under, and the material to be heated within, a protective atmosphere.

2. A continuous annealing process for moving elongate metal material which comprises passing the material through first and second liquid heat transfer medium stations; circulating electrically conductive liquid metal heat transfer medium around a closed path including said first and second stations to form with the liquid medium and continuously maintain during operation an electrically conductive circuit between said first and second stations, and the direction of circulation of said liquid medium through said first and second stations being opposite to that of said material therethrough; heating that part of said material passing between said first and second stations by transformer action to induce a secondary current circulating around a closed electrical circuit formed by the material to be heated, the liquid medium at said first and second stations, and said electrically conductive circuit; and maintaining said liquid medium under, and the material to be heated within, a protective atmosphere during operation.

3. A process according to claim 2 wherein said liquid metal heat transfer medium is lead.

4. A process according to claim 2 wherein said liquid metal heat transfer medium is a lead/bismuth alloy.

5. A process according to claim 4 wherein said alloy is lead/bismuth eutectic.

6. A process according to claim 2 which comprises bridging by short circuit means said liquid heat transfer medium at said first and second stations during termination of one cycle of operation, and after solidification of said liquid medium initiating the next cycle of operation inducing a secondary current in the closed circuit formed by the bridged solidified heat transfer medium to reliquefy said medium.

7. A continuous annealing process for moving elongate metal material which comprises passing the material in succession through first and second liquid heat transfer medium stations; circulating electrically conductive liquid metal heat transfer medium between said first and second stations, the direction of circulation of the liquid medium through said first and second stations being opposite to that of said material therethrough; bridging said liquid medium at said first and second stations by short circuit means; heating that part of said material passing between said first and second stations by transformer action to induce a secondary current circulating around a closed electrical circuit formed by the material to be heated, the liquid medium at said first and second stations, and said short circuit means; and maintaining said liquid medium in, and said material under, a protective atmosphere during operation.

8. Apparatus for the continuous annealing of moving elongate metal material comprising a preheat chamber; a quench chamber; means for passing the material in succession through said preheat chamber and then said quench chamber; a closed circulation system for electrically conductive liquid metal heat transfer medium including a first conduit connecting said quench chamber adjacent the entry point of said material thereinto to said preheat chamber adjacent the exit point of said material therefrom, a second conduit connecting said preheat chamber adjacent the entry point of said material thereinto to said quench chamber adjacent the exit point of said material therefrom, and a pump operably connected with one of said first and second conduits to circulate the liquid medium from said quench chamber to said preheat chamber through said first conduit and vice versa through said second conduit, liquid medium in said closed circulation system forming a closed electrical circuit with material passing between said preheat and quench chambers; a transformer heating arrangement including a primary winding and a core, which core is disposed around said closed electrical circuit as secondary circuit for the transformer arrangement; and means for maintaining said liquid medium under, and material passing between said preheat and quench chambers under, a protective atmosphere.

9. Apparatus according to claim 8 wherein said preheat and quench chambers are formed within a common container, including a partition member separating said container into said chambers and, at the same time, forming said first conduit as a duct connecting said chambers at adjacent inner parts within said container.

10. Apparatus according to claim 8 wherein said pump comprises an electromagnetic pump.

11. Apparatus according to claim 8 wherein said material passing means comprises at least one guide roll in each of said preheat and quench chambers to guide said material along a looped path therethrough, and which apparatus further comprises baffle members disposed within the loops of the material path through said preheat and quench chambers.

12. Apparatus for the continuous annealing of moving elongate metal material comprising a preheat chamber; a quench chamber; a closed circulation system for electrically conductive liquid metal heat transfer medium including a first conduit connecting said quench chamber adjacent the entry point of said material thereinto to said preheat chamber adjacent the exit point of said material therefrom, a second conduit connecting said preheat chamber adjacent the entry point of said material thereinto to said quench chamber adjacent the exit point of said material therefrom, and a pump operably connected with one of said first and second conduits to circulate the liquid medium from said quench chamber to said preheat chamber through said first conduit and vice versa through said second conduit; an electrical short circuit member bridging said preheat and quench chambers to form a closed electrical circuit with liquid medium passing through said preheat and quench chambers and material passing therebetween; a transformer heating arrangement including a primary winding and a core, which core is disposed around said closed electrical circuit as secondary circuit for the transformer arrangement; and means for maintaining said liquid medium under, and material passing between said preheat and quench chambers under, a protective atmosphere.

References Cited by the Examiner

UNITED STATES PATENTS

| 1,319,085 | 10/19 | Jacobson | 148—4 |
| 1,544,506 | 6/25 | Tytus | 266—3 X |
| 1,676,685 | 7/28 | Cammen | 266—3 X |
| 2,755,327 | 7/56 | Tama | 22—79 X |

FOREIGN PATENTS

| 123,728 | 9/01 | Germany. |
| 693,411 | 7/53 | Great Britain. |

DAVID L. RECK, *Primary Examiner.*

WINSTON A. DOUGLAS, *Examiner*